United States Patent [19]
Kawabata et al.

[11] Patent Number: 6,144,425
[45] Date of Patent: Nov. 7, 2000

[54] LIQUID CRYSTAL PANEL AND MANUFACTURING METHOD THE SAME WITH A THICKNESS OF THE ADHESIVE LAYER ADJUSTED TO ELIMINATE A STEP DIFFERENCE

[75] Inventors: Masae Kawabata, Tenri; Yoshihiro Izumi, Kashihara, both of Japan

[73] Assignee: Sharp Kabushiki Kaisha, Osaka, Japan

[21] Appl. No.: 09/163,082

[22] Filed: Sep. 29, 1998

[30]    Foreign Application Priority Data

Oct. 2, 1997 [JP] Japan ................................ 9-269950

[51] Int. Cl.[7] .................. G02F 1/133; G02F 1/1333; G02F 1/1339
[52] U.S. Cl. .................. 349/73; 349/122; 349/155
[58] Field of Search ............... 349/73, 155, 157, 349/122

[56]    References Cited

U.S. PATENT DOCUMENTS

| | | | |
|---|---|---|---|
| 5,193,020 | 3/1993 | Shiozaki et al. | 359/73 |
| 5,359,443 | 10/1994 | Toyooka et al. | 359/76 |
| 5,379,139 | 1/1995 | Sato et al. | 359/81 |
| 5,838,405 | 11/1998 | Izumi et al. | 349/73 |
| 5,847,785 | 12/1998 | Izumi | 349/73 |
| 5,956,108 | 9/1999 | Izumi et al. | 349/73 |

FOREIGN PATENT DOCUMENTS

| | | |
|---|---|---|
| 60-191029 | 12/1985 | Japan . |
| 61-11187 | 1/1986 | Japan . |
| 8-122769 | 5/1996 | Japan . |
| 8-271871 | 10/1996 | Japan . |

*Primary Examiner*—Walter Malinowski
*Attorney, Agent, or Firm*—Dike, Bronstein, Roberts & Cushman, LLP; George W. Neuner; David G. Conlin

[57]    ABSTRACT

A liquid crystal panel in accordance with the present invention has a structure of connected substrate composed of a single unit electrode substrate and a plurality of small substrates combined with the single unit electrode substrate via a sealant. A connected portion of the plurality of small substrates is filled with an adhesive, and the adhesive is also applied on an entire surface of the plurality of small substrates, that is, on a surface of the electrode substrates having a connected structure. A flexible coating layer covering the plurality of small substrates is attached via the adhesive. The coating layer may be attached via the adhesive to a single multi-panel composed of a plurality of divided liquid crystal panels connected to one another on the sides where the plurality of divided liquid crystal panels constitute a pair of electrode substrates sandwitching a liquid crystal layer. With these arrangements, the connected portion does not become noticeable by the adhesive protruding from the connected portion, thus realizing high quality displaying.

23 Claims, 15 Drawing Sheets

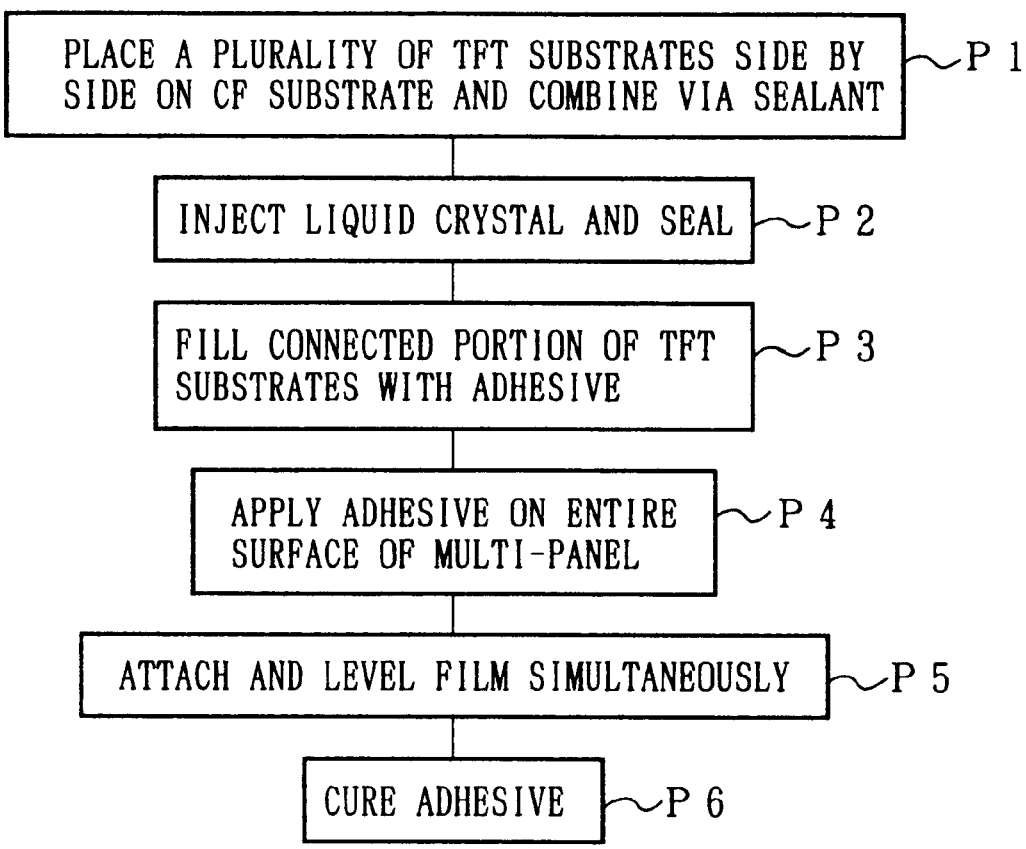

LIQUID CRYSTAL PANEL AND MANUFACTURING METHOD THE SAME WITH A THICKNESS OF THE ADHESIVE LAYER ADJUSTED TO ELIMINATE A STEP DIFFERENCE

FIELD OF THE INVENTION

The present invention relates to a liquid crystal panel which is a component of a liquid crystal display device used as a display device of AV (Audio-Visual) equipment and OA (Office Automation) equipment, and a manufacturing method thereof.

BACKGROUND OF THE INVENTION

Shifting into the information age, a demand for finer and larger display screen has not been higher for a display device of AV equipment such as television and of OA equipment such as a monitor. In order to meet such a demand, development and practical application of larger screen has been under way in various display devices such as CRT (Cathode Ray Tube) display device, liquid crystal display device (LCD: Liquid Crystal Display), plasma display device (PDP), EL (Electro Luminescent) display device, and LED (Light Emitting Diode) display device.

Of those devices, compared with other display devices, the liquid crystal display device has such an advantage in that the dimension of the depth (thickness) can be made significantly thinner, power consumption is low, and a full-color image can be obtained with ease. For these reasons, the liquid crystal display device has been applied in a wide variety of fields, and expectations are high for realizing a larger screen.

However, the liquid crystal display device has a drawback that when the screen is made larger and the resolution is increased, the fraction defective induced by breakage of signal lines and a pixel failure is conspicuously increased in the manufacturing process of a liquid crystal panel, which is a component of the liquid crystal display device, and this increases the cost of the device.

In order to solve this problem, for example, Japanese Publication for Unexamined Utility Model No. 191029/1985 (Jitsukaisho 60-191029) discloses a liquid crystal panel having a structure wherein, as shown in FIG. 12, one of a pair of electrode substrates 101 and 102 (here 101) sandwitching a liquid crystal layer 104 constitutes a single multi-substrate 101 composed of a plurality of small substrates 101a which are connected to one another on the sides by an adhesive 103. In FIG. 12, 105 is a sealant for combining the multi-substrate 101 and the electrode substrate 102.

Also, Japanese Publication for Unexamined Utility Model No. 11187/1986 (Jitsukaisho 61-11187) discloses a structure wherein, in addition to the arrangement wherein the plurality of small substrates 101a constitute the multi-substrate 101 by being connected to one another on the sides, as shown in FIG. 13, the plurality of small substrates 101a are positioned side by side close to one another, and are connected to one another by attaching a resin sheet 106 covering the surfaces of the small substrates 101a.

Further, Japanese Unexamined Patent publication No. 122769/1996 (Tokukaihei 8-122769) discloses a structure wherein a plurality of liquid crystal panels are placed side by side on a transparent supporting substrate, and a single multi-panel is composed by combining (a) the plurality of liquid crystal panels with each other and (b) the supporting substrate and each of the plurality of liquid crystal panels.

In the case where the multi-substrate 101 or the multi-panel is composed by connecting the plurality of substrates or the liquid crystal panels to one another, when diffraction or scattering of light occurs at the connected portion, the connected portion becomes noticeable and the display quality is lowered. Thus, as the adhesive 103, a material, such as UV curable adhesive, having adhesion and substantially the same refractive index as that of the small substrates 101a or the electrode substrates constituting the liquid crystal panel is adopted.

As an example of the multi-panel structure as described above, although not shown, a display device disclosed in Japanese Unexamined Patent publication No. 271871/1996 (Tokukaihei 8-271871) is available. This display device has a structure wherein the multi-panel is sandwitched between a large substrate and a coating layer made from polymers or glass.

However, in the structure of Japanese Publication for Unexamined Utility Model No. 191029/1985 (Jitsukaisho 60-191029), as shown in FIG. 12, it is required to treat the adhesive 103a which has protruded on the back side of the multi-panel 101. When the protruded adhesive 103a is scraped off after curing, a step-difference or uneven surface is generated on the scraped portion and scattering of light is induced, and the connected portion becomes noticeable. On the other hand, when the adhesive 103a is left exposed, the surface of the adhesive 103a is scratched in the manufacturing process, and scattering of light is also induced this time by the scratch, and as a result the connected portion becomes noticeable and the display quality is lowered.

Meanwhile, in the structure of Japanese Publication for Unexamined Utility Model No. 11187/1986 (Jitsukaisho 61-11187), although it is not required to treat the adhesive 103a, it is difficult to ensure that the small substrates 101a are connected close to one another on the sides, and a layer of air is formed at the connected portion. As a result, there is a case where the connected portion becomes noticeable due to the difference in refractive index of the air layer and the substrates.

Further, Japanese Publication for Unexamined Utility Model No. 11187/1986 (Jitsukaisho 61-11187) does not disclose the manufacturing steps, and as shown in FIG. 14(a), when the multi-substrate 101 is composed by connecting the small substrates 101a to one another by the resin sheet 106, and the multi-substrate 101 is combined with the electrode substrate 102 by the sealant 105 provided on the periphery of the electrode substrate 102, as shown in FIG. 14(b), a non-uniform cell gap (thickness of liquid crystal layer 104) is induced by the nonuniformity in the substrate thickness of the small substrates 101a made of glass or other materials, and the display quality is significantly lowered.

Also, when the cell gap is to be made uniform by combining first the electrode substrate 102 with each of the small substrates 101a by the sealant 105, as shown in FIG. 15, a step-difference is generated by the thicknesses of the substrates. As a result, an air bubble 107 is likely to be trapped at the portion of the step-difference when attaching the resin sheet 106.

In the structure of Japanese Unexamined Patent publication No. 122769/1996 (Tokukaihei 8-122769), the adhesive protrudes on the surface (other side of the surface facing the supporting substrate) of the multi-panel, thus having the same problem as that of Japanese Publication for Unexamined Utility Model No. 191029/1985 (Jitsukaisho 60-191029).

Also, in Japanese Unexamined Patent publication No. 271871/1996 (Tokukaihei 8-271871), the main object is to prevent volume shrinkage of the adhesive filling a spacing between a large substrate and a multi-panel so as to stabilize the structure of the multi-panel. For this reason, the protrusion of adhesive from the connected portion of the panels to the side of the coating layer cannot be prevented effectively, and the disclosure is applicable only to the multi-panel structure.

SUMMARY OF THE INVENTION

The present invention offers a solution to the above-mentioned problems, and accordingly it is an object of the present invention to provide a liquid crystal panel composed of a plurality of small substrates or a liquid crystal panel of a single multi-panel composed of a plurality of divided liquid crystal panels, in which a connected portion is not noticeable, and a manufacturing method thereof.

In order to solve the above-mentioned problems, a first liquid crystal panel of the present invention includes:

a pair of electrode substrates and a liquid crystal layer sandwitched between the pair of electrode substrates, one of the pair of electrode substrates being a substrate of a single unit and an other of the pair of electrode substrates being composed of a plurality of small substrates connected to one another on sides, the plurality of small substrates combined with the substrate of a single unit, wherein an adhesive layer is formed on a connected portion and an entire surface of the plurality of small substrates, and a coating layer having flexibility is attached via the adhesive layer so as to cover the plurality of small substrates.

Also, a second liquid crystal panel of the present invention includes:

a single multi-panel composed of a plurality of divided liquid crystal panels connected to one another on sides, the plurality of divided liquid crystal panels being a pair of electrode substrates sandwitching a liquid crystal layer; and a supporting substrate combined with the single multi-panel, the plurality of divided liquid crystal panels being combined with the supporting substrate via an adhesive layer, the adhesive layer being formed on a connected portion and an entire surface of the plurality of divided liquid crystal panels, the plurality of divided liquid crystal panels being covered with a coating layer having flexibility via the adhesive layer, the adhesive layer and the coating layer leveling a surface of the single multi-panel.

With the arrangement of the first and second liquid crystal panels, since the coating layer is formed on the surface where the adhesive filling the connected portion of the small substrates or the adhesive filling the connected portion of the divided liquid crystal panels protrudes, the adhesive protruding from the connected portion is not exposed, thus preventing the problem that the connected portion becomes noticeable by the adhesive protruded from the connected portion.

Also, by controlling the thickness of the adhesive layer for adhering the coating layer, the step-difference due to the difference in thickness of the substrates constituting the small substrates or the divided liquid crystal panels is eliminated, and the surface of the coating layer is leveled, thus preventing the air bubble from being trapped at the step-difference portion.

Further, since the coating layer has flexibility, the coating layer can be leveled with ease when attaching, and it is possible to relieve the distortion of the liquid crystal panel by absorbing the stress caused by the shrinkage of the adhesive upon curing, thus maintaining a uniform cell gap.

A third liquid crystal panel of the present invention has an arrangement, in addition to the described arrangement of the first and second liquid crystal panels, wherein between the pair of electrode substrates, there are provided adhesive spacers having adhesion to the pair of electrode substrates, for maintaining a predetermined dimension of the thickness of the liquid crystal layer.

With this arrangement, the adhesive spacer, with the coating layer having flexibility, absorbs the stress caused by shrinkage of the adhesive upon curing, and the distortion of the liquid crystal panel is relieved, thus maintaining a uniform cell gap.

A manufacturing method of the first liquid crystal panel of the present invention includes the steps of:

forming a pair of electrode substrates facing each other by combining with each other via a sealant (A) an electrode substrate composed of a plurality of small substrates connected to one another on sides and (B) a single unit electrode substrate;

enclosing a liquid crystal layer in a spacing between the pair of electrode substrates; and applying an adhesive on a connected portion and an entire surface of the plurality of small substrates, and attaching a coating layer having flexibility levely so as to cover the plurality of small substrates, and thereafter curing the adhesive.

With this method, since the plurality of small substrates are first attached to the single unit electrode substrate via a sealant, even when the thicknesses of the small substrates vary, the cell gap does not become nonuniform. Also, even when a step-difference is generated on the surface to be attached to the coating layer due to the difference in thickness of the small substrates, since the coating layer is attached levely by adjusting the thickness of the adhesive layer, an air bubble is not trapped at the step-difference portion, and by the coating layer, the adhesive protruded from the connected portion is prevented from being exposed, thereby eliminating the problem that the connected portion becomes noticeable by the protrusion of the adhesive.

A manufacturing method of the second liquid crystal panel of the present invention includes the steps of:

placing a plurality of divided liquid crystal panels on a supporting substrate applied with an adhesive so as to connect the plurality of divided liquid crystal panels to one another on sides, the plurality of divided liquid crystal panels being a pair of electrode substrates sandwitching a liquid crystal layer; and applying an adhesive on a connected portion and an entire surface of the plurality divided liquid crystal panels, and attaching a coating layer having flexibility levely so as to cover the plurality of divided liquid crystal panels, and thereafter curing the adhesive.

With this method, even when a step-difference is generated on the surface to be attached to the coating layer due to the difference in thickness of the small substrates, since the coating layer is attached levely by adjusting the thickness of the adhesive layer, an air bubble is not trapped at the step-difference portion, and by the coating layer, the adhesive protruded from the connected portion is prevented from being exposed, thereby eliminating the problem that the connected portion becomes noticeable by the protrusion of the adhesive.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a flowchart showing manufacturing steps of the liquid crystal panel of FIG. 1.

DESCRIPTION OF THE EMBODIMENTS

[First Embodiment]

The following will describe one embodiment of the present invention referring to attached drawings. Note that, here, explanations are based on the case of adopting, as an example, an active-matrix driven liquid crystal display device provided with active elements.

Figure 1:
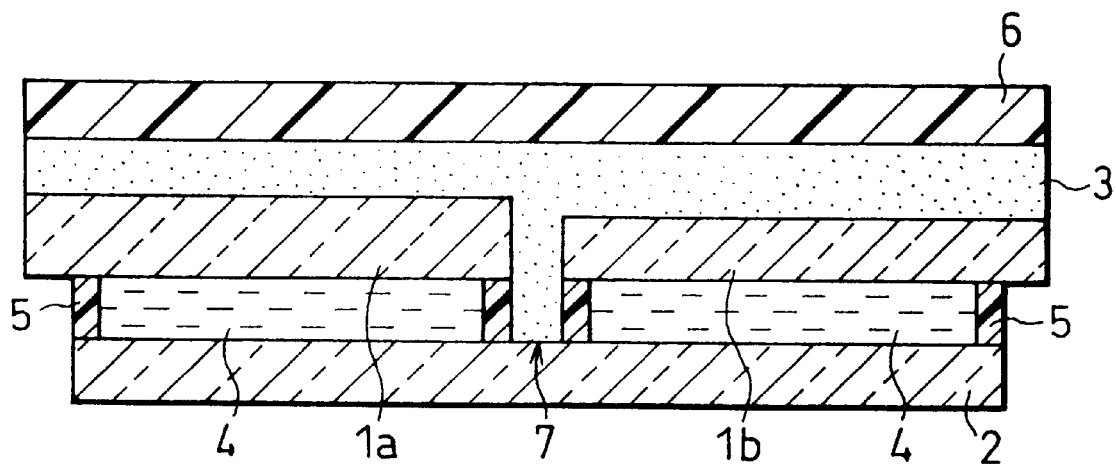
FIG. 1 is a cross sectional view showing a structure of a liquid crystal panel provided in a liquid crystal display device in accordance with First Embodiment of the present invention.

As shown in FIG. 1, a liquid crystal panel (first liquid crystal panel) provided in the liquid crystal display device of the present embodiment has an arrangement wherein a CF substrate (single unit electrode substrate) 2 provided with counter electrodes (not shown) and a color filter (not shown) is combined with two TFT substrates (small substrates) 1a and 1b (active-matrix substrates) via a sealant (periphery sealing section) 5, and a liquid crystal layer 4 is enclosed in a spacing between the CF substrate 2 and the TFT substrates 1a and 1b.

The state in which the TFT substrates 1a and 1b are combined with the CF substrate 2, to put it in another way, is the state wherein the TFT substrates 1a and 1b are connected to each other on the sides so that the TFT substrates 1a and 1b constitute a connected electrode substrate of a single unit.

Although not shown, on each of the TFT substrates 1a and 1b, there are provided matrix wiring of gate bus lines for transmitting a scanning signal and source bus lines for transmitting a video signal, and per each intersection of the matrix wiring, a pixel electrode and a TFT (Thin Film Transistor) for driving the pixel electrode are provided. The ON and OFF states of the TFT are controlled by a scanning signal, and in the ON state, the TFT applies a video signal to the pixel electrode. Note that, respective color films of color filters of RGB are formed in accordance with the shape of each pixel electrode.

On the upper side (other side of the side facing the CF substrate) of the TFT substrates 1a and 1b, a flexible transparent film (coating layer) 6 is attached via an adhesive 3. The TFT substrates 1a and 1b are also connected to each other on the sides by the adhesive 3.

As the adhesive 3, a UV curable adhesive, used for attaching optical lenses, which is instantly cured upon irradiation of UV light is suitably adopted. Also, it is preferable that the refractive index of the adhesive 3 is the same as the refractive index of the substrates made of, for example, glass, constituting the TFT substrates 1a and 1b.

As the film 6, a material having flexibility is required. For example, a high polymer film is suitably adopted. The flexibility adds the film 6 a strength against bending, and allows trapped air to be pushed out when attaching so that the film 6 is attached levely. The film 6 is required to be flexible because in the case of adopting, for example, the UV curable adhesive as the adhesive 3, volume shrinkage occurs when curing, and bowing of liquid crystal panel is induced by the distortion caused by the shrinkage, and as a result the cell gap is changed. Thus, by adopting a flexible film as the film 6, it is possible to relieve the distortion as caused by the shrinkage, and a uniform cell gap is maintained.

Further, as the film 6, considering the fact that the UV curable adhesive is used for the adhesive 3, it is desirable to adopt a material having high transmittance for UV light (wavelength of 300 nm to 400 nm). This allows the adhesive 3 to be irradiated uniformly by the UV light from the side of the film 6 when curing, thus curing the adhesive 3 efficiently.

Furthermore, as the film 6, it is desirable to select a material having optical isotropy. This realizes desirable displaying characteristics without disturbing the controlled state of the polarized light having transmitted through the liquid crystal layer 4. As an isotropic film, poly(methyl methacrylate) (PMMA) or amorphous polyolefin may be adopted. However, as the material of the film 6, amorphous polyolefin having high transmittance for UV light is suitable.

Figure 2:
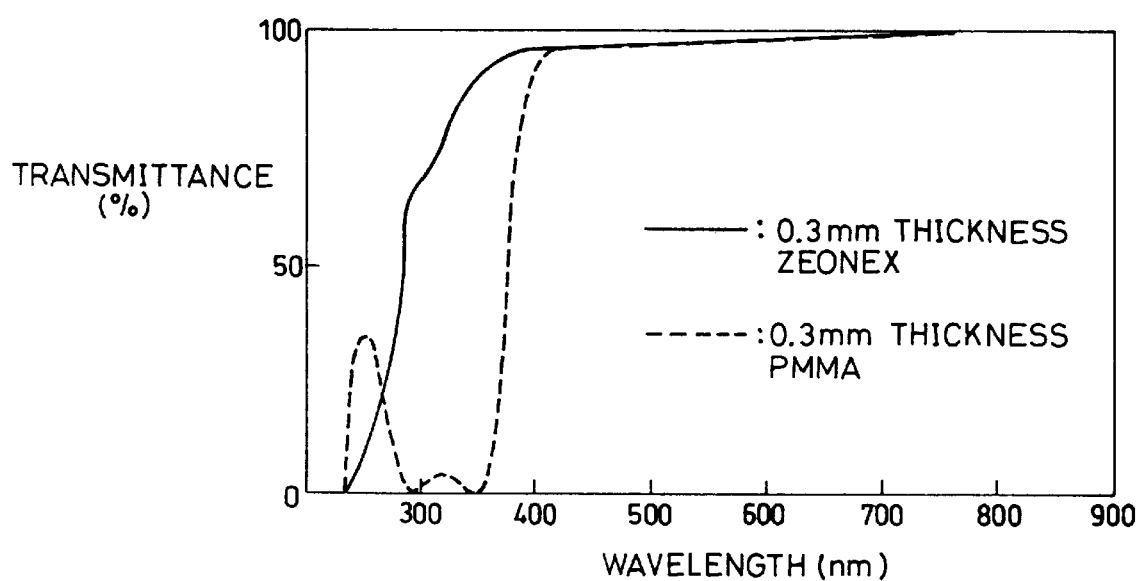
FIG. 2 is a graph showing wavelength-transmittance characteristics of ZEONEX (product name) which is thermoplastic resin of olefin having a ring structure and PMMA, both in the form of films.

FIG. 2 shows the result of examination for wavelength-transmittance characteristics of PMMA and the Nippon Zeon Co., Ltd. product ZEONEX made from thermoplastic resin of olefin having a ring structure provided as amorphous polyolefin, respectively having a thickness of 0.3 mm. As is clear from the graph of FIG. 2, ZEONEX has higher transmittance for UV light than that of PMMA.

The following describes the manufacturing steps of the liquid crystal panel referring to the flowchart of FIG. 3, and to FIG. 4(a) through FIG. 4(c) and FIG. 5(a) through FIG. 5(c) which show the cross sectional view at each step.

Figure 4A:
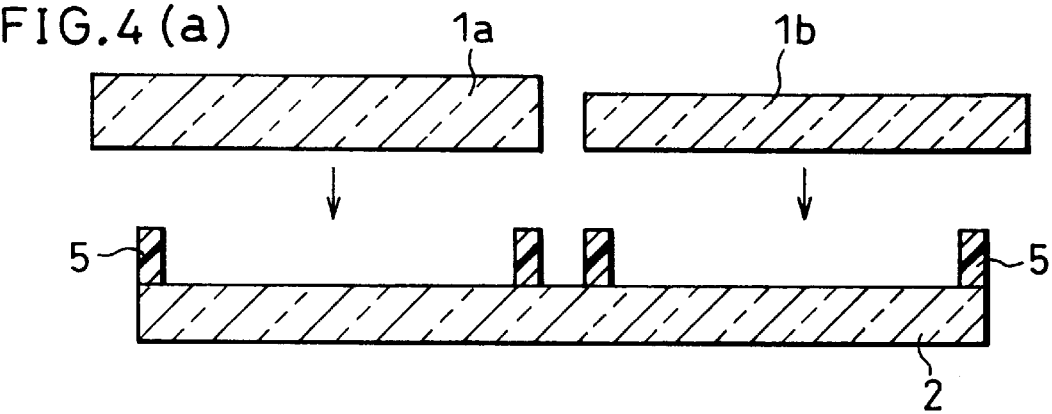
FIG. 4(a) through FIG. 4(c) are cross sectional views explaining the manufacturing steps of the liquid crystal panel of FIG. 1.

First, as shown in FIG. 4(a), on a predetermined position of the CF substrate 2, namely, on a position to be combined with the two TFT substrates 1a and 1b, the sealant 5 made of epoxy resin or other materials is applied by screen printing or dispenser method. Then, the TFT substrates 1a and 1b are placed on the predetermined position, and are combined by adjusting the pressing force so that a predetermined cell gap is obtained. Thereafter, the sealant 5 is cured (P1) Note that, here, the sealant 5 is positioned on the side of the CF substrate 2. However, the sealant 5 may be positioned on the side of the TFT substrates 1a and 1b, or on the both sides of the CF substrate 2 and the TFT substrates 1a and 1b.

Figure 4B:
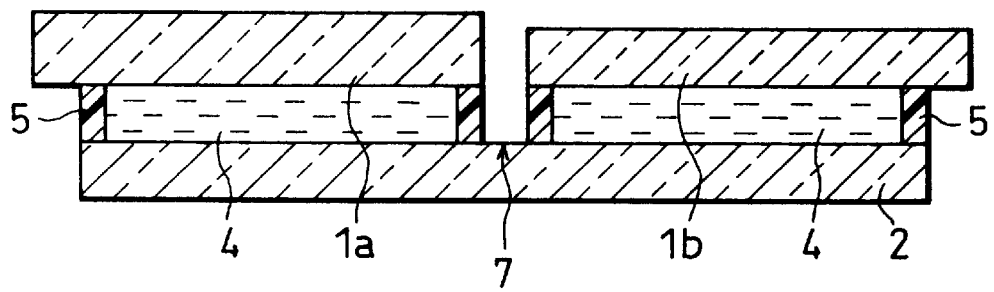

Then, as shown in FIG. 4(b), between the substrates of a liquid crystal panel (referred to as multi-panel hereinafter) after P1, liquid crystal is injected by vacuum injection method or by other methods through injection openings (not shown), and thereafter the injection openings are sealed, thus forming the liquid crystal layer 4 (P2).

Figure 4C:
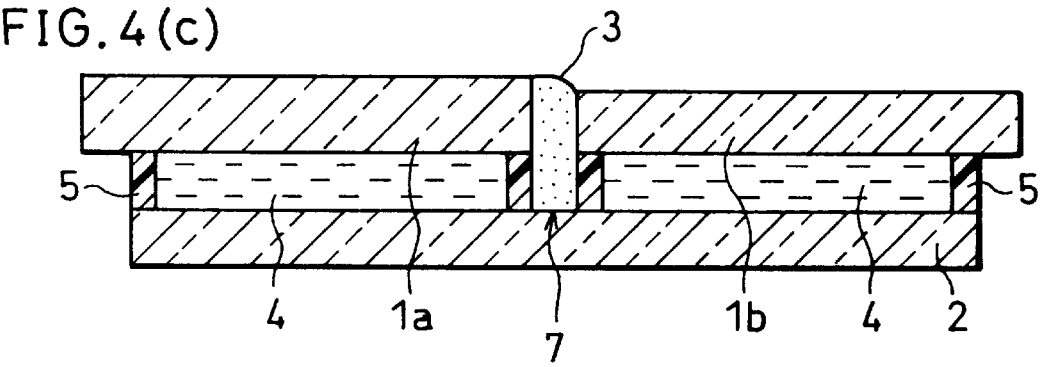

Then, as shown in FIG. 4(c), a connected portion 7 of the multi-panel is filled with the adhesive 3 for which the UV curable resin is adopted (P3). The connected portion 7 is filled with the adhesive 3 mainly by the capillary action, and injection is made by slowly dispensing the adhesive 3 along the groove of the connected portion 7 using the dispenser method while guiding the permeation of the capillary action. Therefore, because the permeation is difficult when the viscosity of the adhesive 3 is too high, the adhesive 3 with a viscosity of 300 cP to 2000 cP is selected.

Figure 5A:
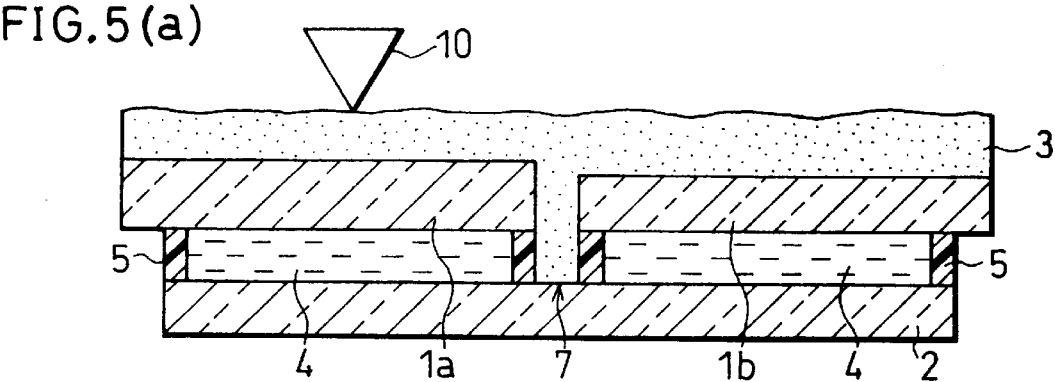
FIG. 5(a) through FIG. 5(c) are cross sectional views explaining the manufacturing steps of the liquid crystal panel of FIG. 1.

When filling of the connected portion 7 with the adhesive 3 is finished, as shown in FIG. 5(a), an appropriate amount of the adhesive 3 is applied on the entire surface of the multi-panel, and the adhesive 3 is spread over uniformly using a squeegee 10 while preventing trapping of air bubbles (P4). Note that, the adhesive 3 may also be applied, other than the described technique, by dipping method or overcoating printing method.

Figure 5B:
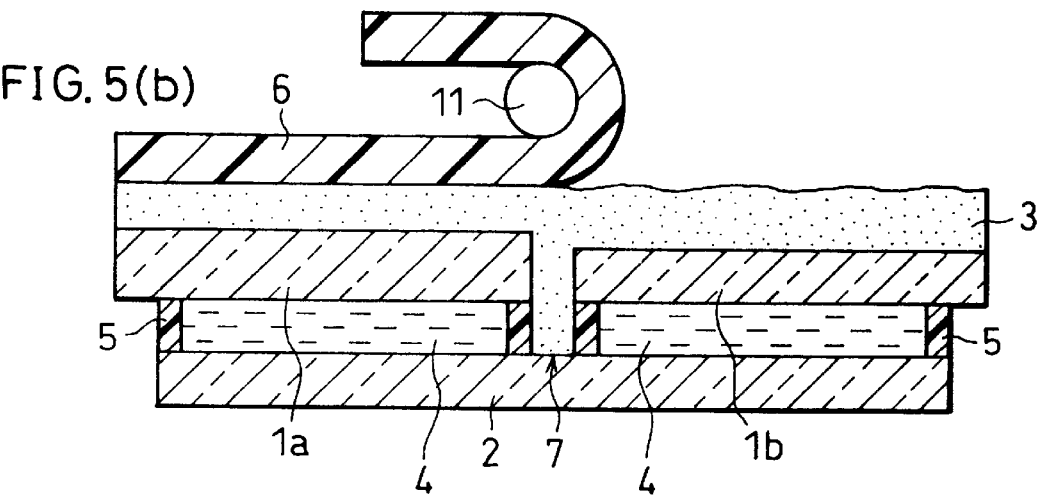
Figure 5C:
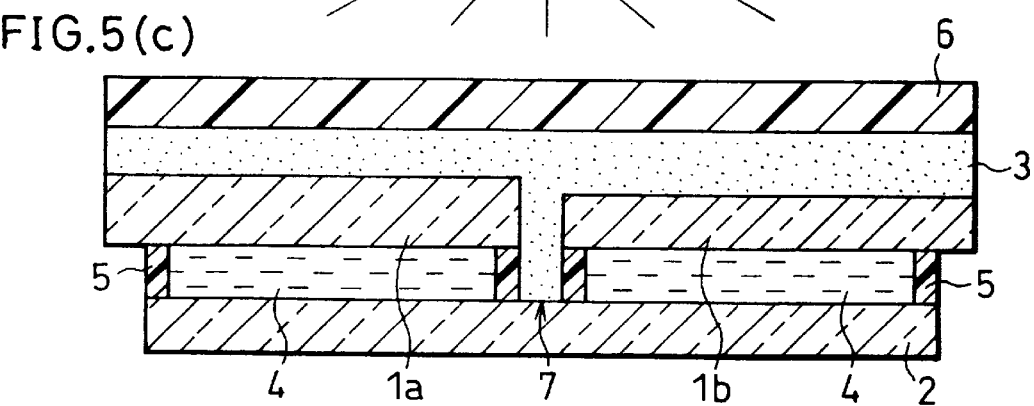

When the adhesive 3 is spread over completely, as shown in FIG. 5(b), the film 6 is attached while pushing out air bubbles using a roller 11 or the squeegee 10 (roller 11 is used in FIG. 5(b)). Here, the surface of the multi-panel attached with the film 6 is leveled by the uniform force applied by the roller 11 or the squeegee 10 (P5). Note that, in the case where a small number of air bubbles are trapped in the process of attaching the film 6, the air bubbles are pushed out using the roller 11 or the squeegee 10 again. Thereafter, as shown in FIG. 5(c), the entire multi-panel is irradiated with the UV light from the side of the film 6 so as to cure the adhesive 3 (P6).

As described, in the above liquid crystal panel, since the film 6 is attached on the surface where the adhesive 3 filling the connected portion 7 of the TFT substrates 1a and 1b protrudes, the adhesive 3 protruded from the connected portion 7 is not exposed, and the connected portion 7 does not become noticeable by the protruded adhesive 3.

Further, by the adhesive 3 filling the connected portion 7 and being applied on the surface of the multi-panel, the step-difference due to the difference in substrate thickness of the TFT substrates 1a and 1b is eliminated. As a result, no air bubble is trapped between the TFT substrates 1a and 1b and the film 6 attached thereon.

Moreover, since the film 6 has flexibility, the film 6 is leveled easily when attaching, and the stress caused by the shrinkage of the adhesive 3 by curing is absorbed and the distortion of the liquid crystal panel is relieved, thus maintaining a uniform cell gap.

Therefore, in the liquid crystal display device of the present embodiment provided with the described liquid crystal panel, the connected portion 7 is not noticeable, and high quality image displaying is realized.

[Second Embodiment]

The following will describe another embodiment of the present invention referring to attached drawings. Note that, for convenience of explanation, members having the same functions as the members described in First Embodiment are given the same reference numerals and explanations thereof are omitted.

Figure 6:
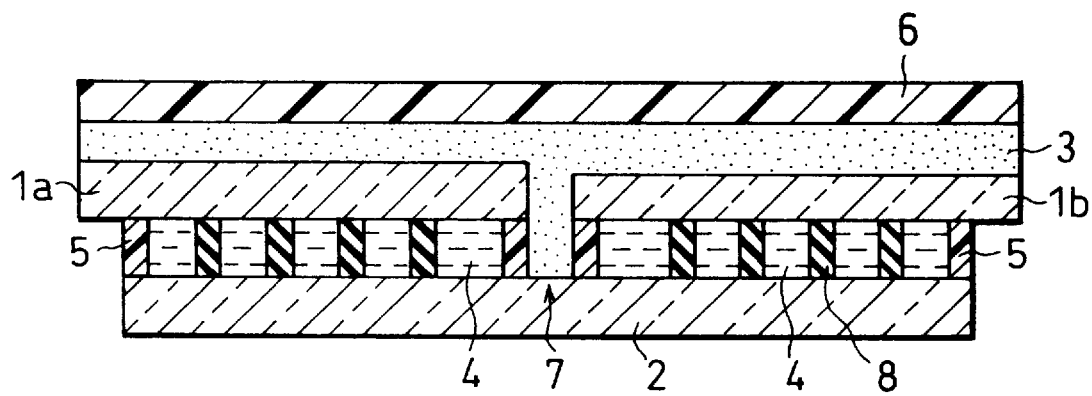
FIG. 6 is a cross sectional view showing a structure of a liquid crystal panel provided in a liquid crystal display device in accordance with Second Embodiment of the present invention.

A liquid crystal panel (third liquid crystal panel) provided in a liquid crystal display device of the present embodiment has the same structure and the manufacturing steps as that of the liquid crystal panel of FIG. 1 except that adhesive spacers 8 are provided. That is, the liquid crystal panel of the present embodiment has an arrangement wherein, as shown in FIG. 6, between the CF substrate 2 and the TFT substrates 1a and 1b, the adhesive spacers 8 adhering to both the CF substrate 2 and the TFT substrates 1a and 1b are provided in the form of walls.

Figure 7:
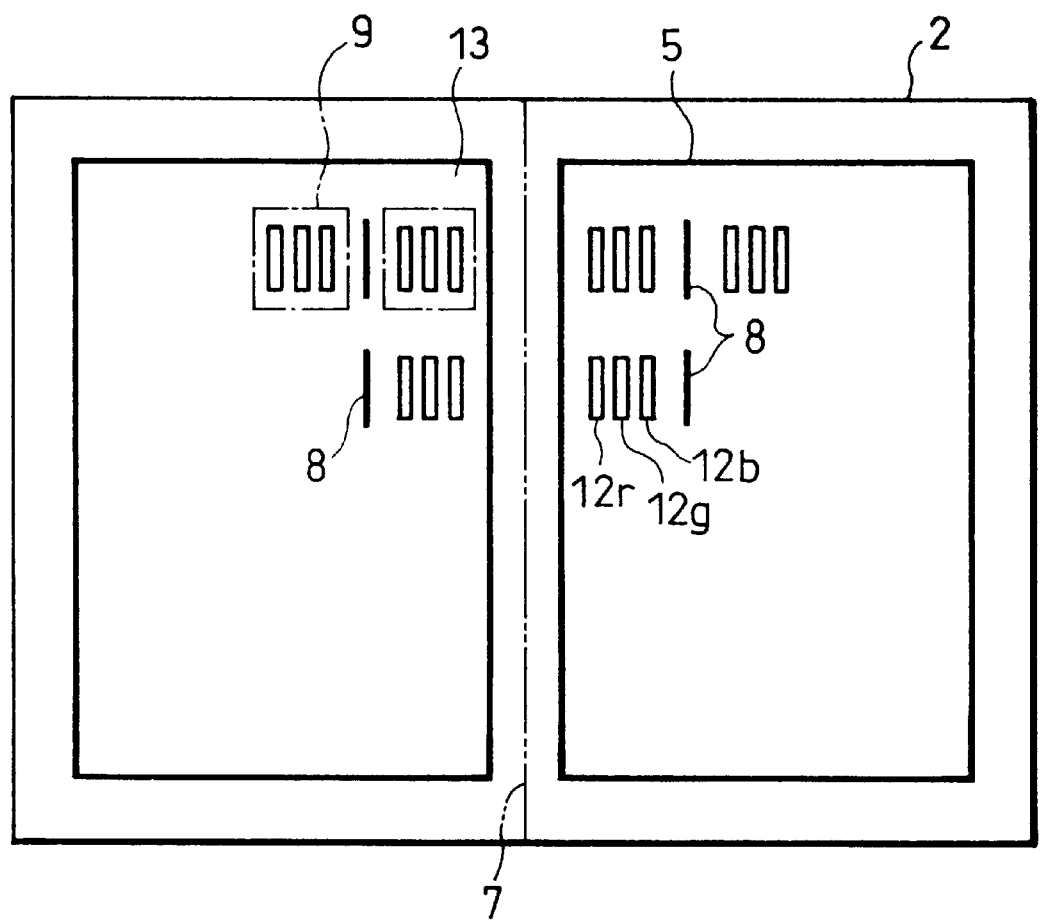
FIG. 7 is a plan view of a CF substrate which is a component of the liquid crystal panel of FIG. 6.

The adhesive spacers 8 are provided, as shown in FIG. 7, on the CF substrate 2 together with the sealant 5. The adhesive spacers 8 are positioned on a non-transmissive region between a display pixel unit 9 which constitutes one display unit surrounded by the alternate long and short line in FIG. 7 and an adjacent display pixel unit 9 so that the adhesive spacers 8 are not visible, and the display quality is not lowered. In FIG. 7, 12r, 12g, and 12b are color films respectively corresponding to the RGB of the color filter, and surrounding the color films 12r, 12g, and 12b is a black matrix 13 which is a non-transmissive film. The color filter is composed of the color films of 12r, 12g, and 12b and the black matrix 13.

In the liquid crystal panel having the above arrangement, since the adhesive spacers 8 are adhered to both the CF substrate 2 and the TFT substrates 1a and 1b, the distortion as caused by shrinkage of the adhesive 3 upon curing can be suppressed even more effectively compared with the case of using the film 6 having flexibility alone, thus maintaining a uniform cell gap.

Therefore, in the liquid crystal display device of the present embodiment, compared with the liquid crystal display device of First Embodiment, image displaying of higher quality is realized.

Figure 8:
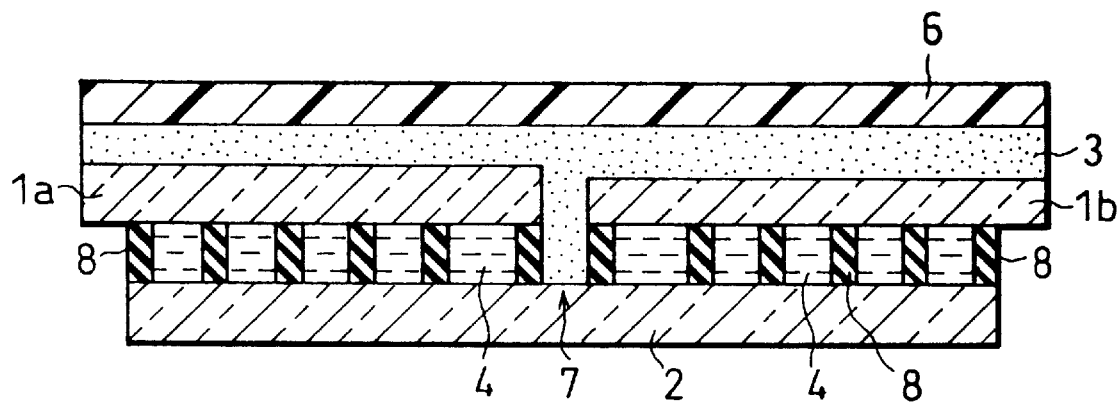
FIG. 8 is a cross sectional view showing a structure of another liquid crystal panel provided in the liquid crystal display device in accordance with Second Embodiment of the present invention.

Note that, here, the adhesive spacers 8 and the sealant 5 are made from different materials. However, as shown in FIG. 8, the adhesive spacers 8 may have the function of the sealant 5. Namely, by the step of forming the adhesive spacers 8 as described above, the material of the adhesive spacers 8 may be positioned on the position where the sealant 5 is provided for sealing the periphery. This allows the adhesive spacers 8 and the periphery sealing section to be formed simultaneously, thus simplifying the manufacturing steps.

[Third Embodiment]

The following will describe yet another embodiment of the present invention referring to attached drawings. Note that, for convenience of explanation, members having the same functions as the members described in First and Second Embodiment are given the same reference numerals and explanations thereof are omitted.

Figure 9:
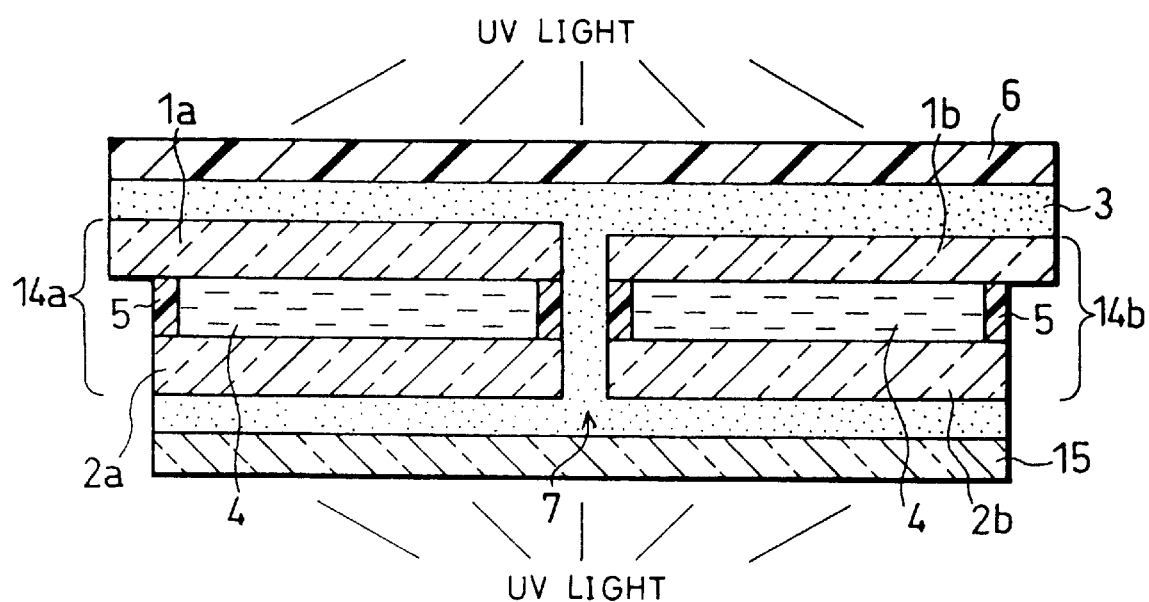
FIG. 9 is a cross sectional view showing a structure of a liquid crystal panel provided in a liquid crystal display device in accordance with Third Embodiment of the present invention.

A liquid crystal panel (second liquid crystal panel) provided in a liquid crystal display device of the present embodiment has as arrangement wherein, as shown in FIG. 9, two divided liquid crystal panels (referred to as divided panels) 14a and 14b are provided side by side on a transparent supporting substrate 15, and the adhesive 3 fills a spacing (a) between the supporting substrate 15 and the divided panels 14a and 14b and (b) between side surfaces (connected portion 7) of the divided panels 14a and 14b and the adhesive 3 is also applied on the upper surface of the divided panels 14a and 14b and the film 6 is attached on the adhesive 3.

In the structure of the divided panels 14a and 14b the CF substrate 2 is also divided into two units, and two CF substrates 2a and 2b and the TFT substrates 1a and 1b are combined with each other via the sealant 5, and the liquid crystal layer 4 is enclosed therebetween.

Figure 10:
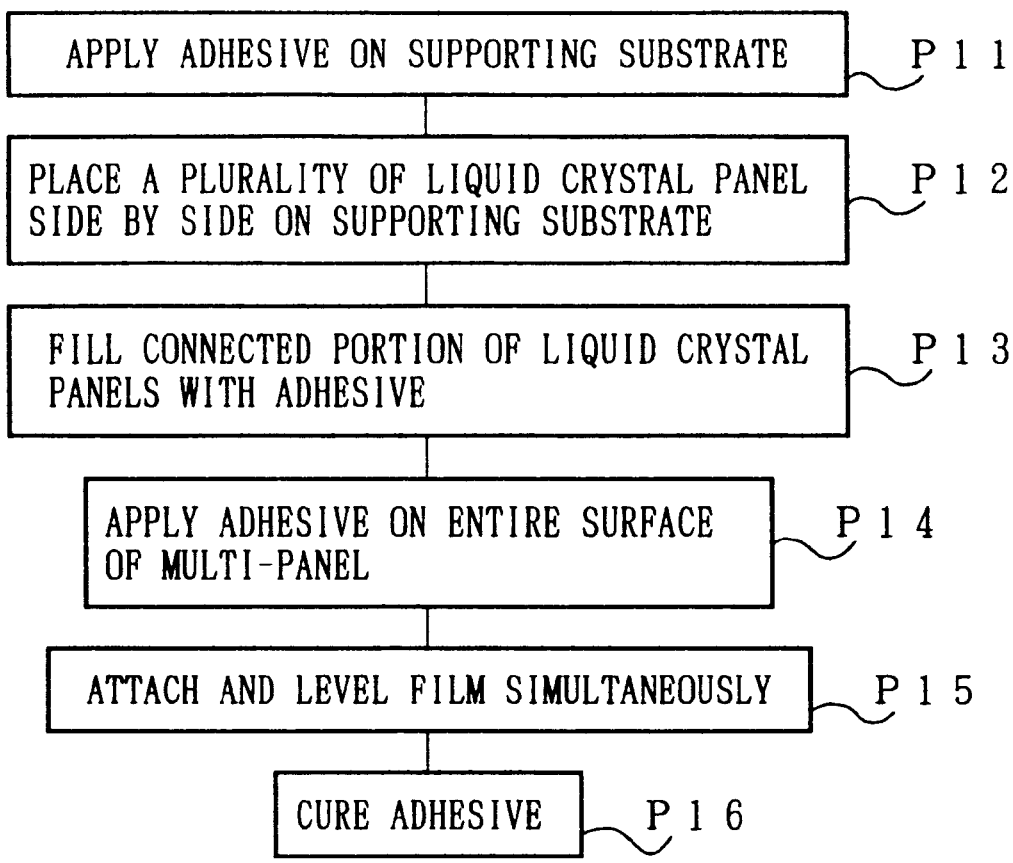
FIG. 10 is a flowchart showing manufacturing steps of the liquid crystal panel of FIG. 9.

The following describes the manufacturing steps of the above liquid crystal panel referring to FIG. 9 and the flowchart of FIG. 10.

First, on the supporting substrate 15, the adhesive 3 is applied (P11). Here, the adhesive 3 is applied in the same manner as the adhesive 3 is applied on the entire surface of the multi-panel in P4 of FIG. 3 in First Embodiment.

Then, on the supporting substrate 15, the divided panels 14a and 14b are positioned side by side (P12). Here, the divided substrates 14a and 14b are positioned in such a manner that the side the CF substrates 2a and 2b faces the supporting substrate 15. In the following, the divided panels 14a and 14b will be treated as a single liquid crystal panel and will be referred to as a multi-panel.

Then, the connected portion 7 of the multi-panel is filled with the adhesive 3 in the same manner as the connected portion 7 is filled with the adhesive 3 in P3 of FIG. 3 in First Embodiment (P13), and thereafter the adhesive 3 is applied on the entire surface of the multi-panel in the same manner as the adhesive 3 is applied on the entire surface of the multi-panel in P4.

When the adhesive 3 is spread over completely, the film 6 is attached in the same manner as the film 6 is attached in P5 of FIG. 3 in First Embodiment, and the surface of the multi-panel attached with the film 6 is leveled (P15).

Then, the entire multi-panel is irradiated with UV light from the both sides of the film 6 and the supporting substrate 15 so as to cure the adhesive 3 (P16).

In the liquid crystal display device provided with the liquid crystal panel of FIG. 9 as manufactured in the described manner, as in the liquid crystal display device of First Embodiment, since the film 6 is formed on the surface where the adhesive 3 filling the connected portion 7 of the divided panels 14a and 14b protrudes, the adhesive 3 protruding from the connected portion 7 is not exposed, and the connected portion 7 does not become noticeable by the adhesive 3.

Further, by the adhesive 3 filling the connected portion 7 and being applied on the surface of the multi-panel, the step-difference caused by the difference in substrate thickness of the divided panels 14a and 14b is eliminated. As a result, no air bubble is trapped between the divided panels 14a and 14b and the film 6 attached thereon. Also, by the flexible film 6, the stress caused by the shrinkage of the adhesive 3 upon curing is absorbed, and the distortion of the liquid crystal panel is relieved, thus maintaining a uniform cell gap.

Therefore, in the liquid crystal display device of the present embodiment, as in the liquid crystal display device of First Embodiment, the connected portion 7 is not noticeable, and high quality image displaying is realized.

[Fourth Embodiment]

The following will describe still another embodiment of the present invention referring to attached drawings. Note that, for convenience of explanation, members having the same functions as the members described in First, Second, and Third Embodiment are given the same reference numerals and explanations thereof are omitted.

Figure 11:
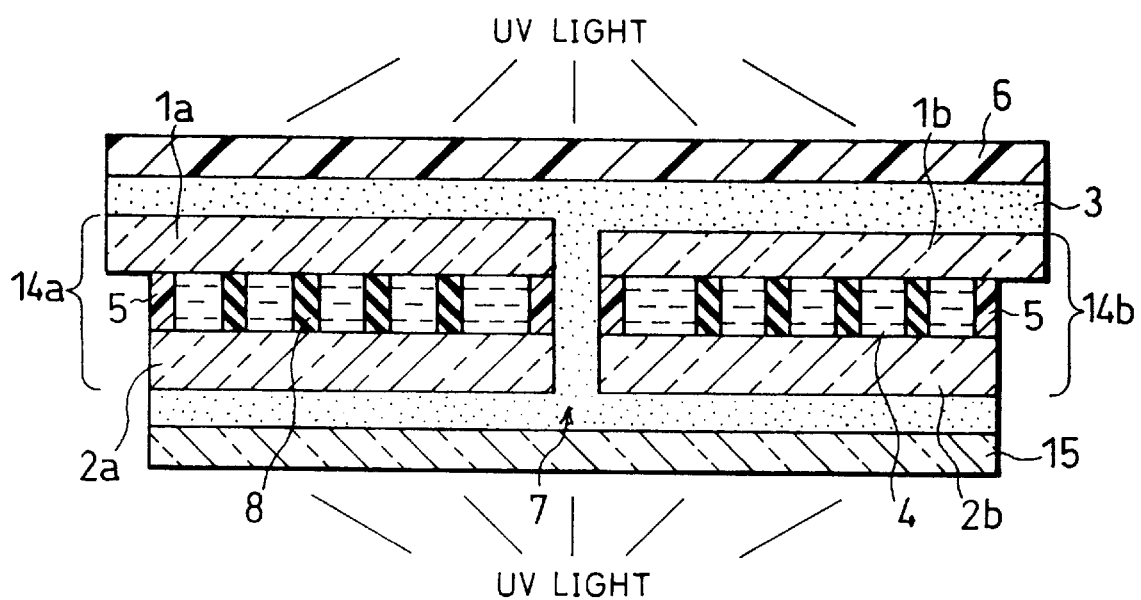
FIG. 11 is a cross sectional view showing a structure of a liquid crystal panel provided in a liquid crystal display device in accordance with Fourth Embodiment of the present invention.
Figure 12:
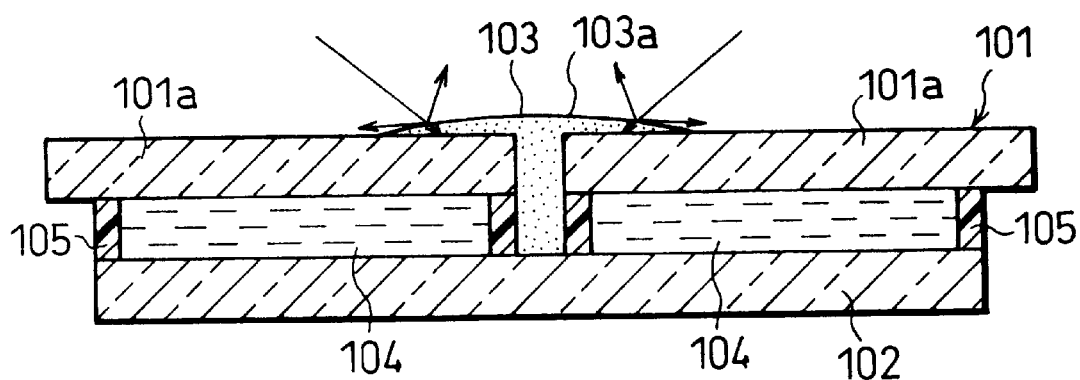
FIG. 12 is a cross sectional view showing a conventional liquid crystal panel.
Figure 13:
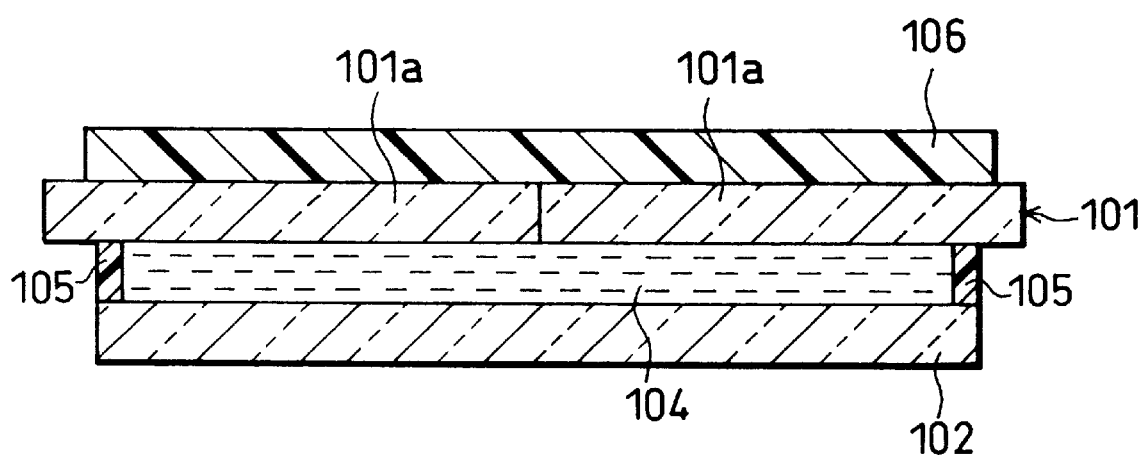
FIG. 13 is a cross sectional view showing a conventional liquid crystal panel.
Figure 14A:
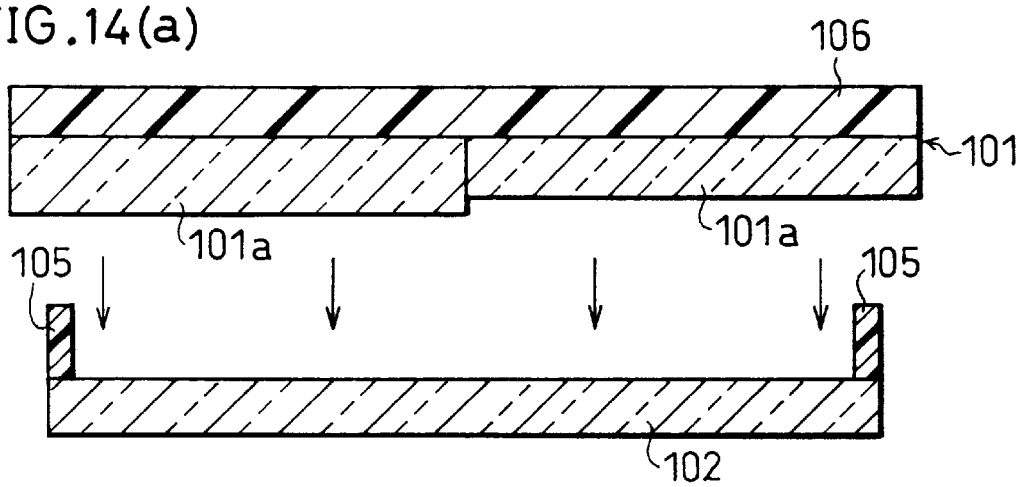
FIG. 14(a) and FIG. 14(b) are cross sectional views showing a conventional liquid crystal panel.
Figure 14B:
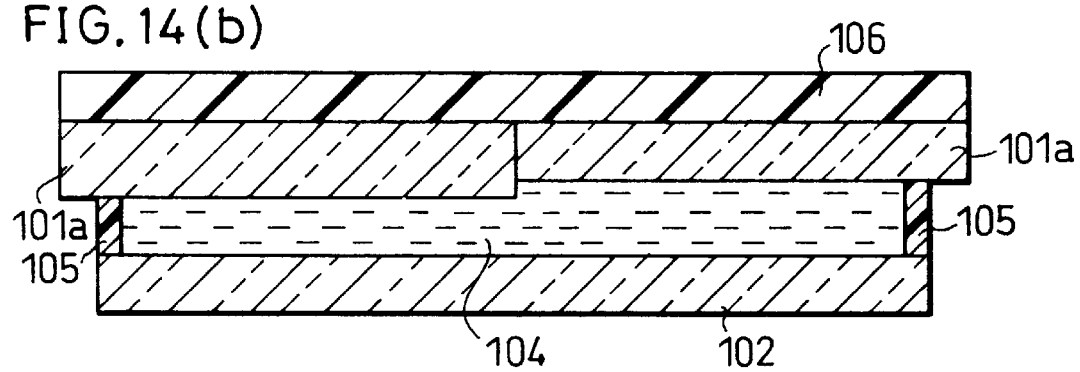
Figure 15:
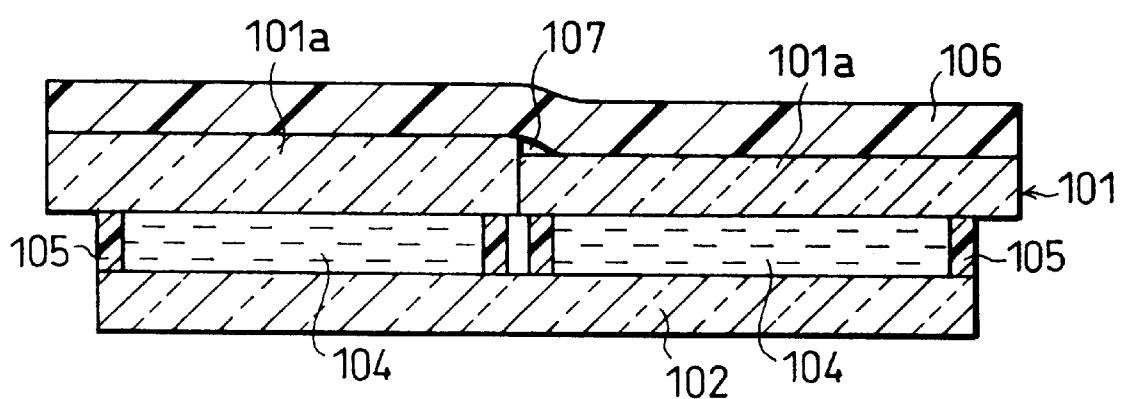
FIG. 15 is a cross sectional view showing a conventional liquid crystal panel.

A liquid crystal panel (third liquid crystal panel) provided in a liquid crystal display device of the present embodiment has the same structure and the same manufacturing steps as that of the liquid crystal panel of FIG. 9 except the structure of the divided panels 14a and 14b wherein, as shown in FIG. 11, between the CF substrates 2a an 2b and the TFT substrates 1a and 1b, adhesive spacers 8 having adhesion to both the CF substrates 2a an 2b and the TFT substrates 1a and 1b are provided in the form of walls.

The positioning and the functions of the adhesive spacers 8 are the same as the one explained in Second Embodiment, and since the distortion as caused by shrinkage of the adhesive 3 upon curing can be suppressed even more effectively compared with the case of using the flexible film 6 alone, more uniform cell gap is maintained.

Therefore, in the liquid crystal display device of the present embodiment, compared with the liquid crystal display device of First Embodiment, image displaying having higher quality is realized.

Also, as described in Second Embodiment, the adhesive spacers 8 may have the function of the sealant 5, and by forming the adhesive spacers 8 and the periphery sealing section simultaneously, it is possible to simplify the manufacturing steps.

As described, a liquid crystal panel in accordance with the present invention has an arrangement wherein at least one of a pair of substrates sandwiching the liquid crystal layer is composed of a plurality of small substrates connected to one another on the sides, and the plurality of small substrates are combined with a single unit electrode substrate via a sealant, and an adhesive layer is formed on the connected portion and the entire surface of the small substrates, and a coating layer having flexibility is attached via the adhesive layer so as to cover the small substrates.

Also, another liquid crystal panel in accordance with the present invention has an arrangement wherein a plurality of divided liquid crystal panels, which constitute a pair of electrode substrates sandwitching the liquid crystal layer, are connected to one another on the sides so as to constitute a single multi-panel, and the plurality of divided liquid crystal panels are combined with a supporting substrate via an adhesive layer, and the adhesive layer is formed on the connected portion and the entire surface of the divided liquid crystal panels, and a coating layer having flexibility is attached via the adhesive layer so as to cover the divided liquid crystal panels.

With these arrangements, since the coating layer is formed on the surface where the adhesive filling the connected portion of the small substrates or the adhesive filling the connected portion of the divided liquid crystal panels protrudes, the adhesive protruding from the connected portion is not exposed, thus preventing the problem that the connected portion becomes noticeable by the adhesive protruded from the connected portion.

Also, by controlling the thickness of the adhesive layer for adhering the coating layer, the step-difference due to the difference in substrate thickness of the small substrates or the substrates constituting the divided liquid crystal panels is eliminated, and the surface of the coating layer is leveled, thus preventing the air bubble from being trapped at the step-difference portion.

Further, since the coating layer has flexibility, the coating layer can be leveled with ease when attaching, and it is possible to relieve the distortion of the liquid crystal panel by absorbing the stress caused by the shrinkage of the adhesive upon curing, thus maintaining a uniform cell gap.

Therefore, by adopting a liquid crystal panel having the described arrangements, it is possible to provide a liquid crystal display device in which the connected portion is not noticeable, capable of high quality image displaying.

Also, it is preferable that the liquid crystal panel in accordance with the present invention has an arrangement, in addition to the described arrangements, wherein between the pair of electrode substrates, there are provided adhesive spacers having adhesion to the pair of electrode substrates, for maintaining a predetermined dimension of the thickness of the liquid crystal layer.

With this arrangement, the adhesive spacers, with the coating layer having flexibility, absorb the stress caused by shrinkage of the adhesive upon curing, and the distortion of the liquid crystal panel is relieved, thus maintaining a uniform cell gap.

Therefore, by adopting a liquid crystal panel having this arrangement, it is possible to provide a liquid crystal display device capable of image displaying with higher quality than the liquid crystal display device having the arrangements described above.

It is preferable that the liquid crystal panel in accordance with the present invention has an arrangement, in addition to the above arrangement, wherein the periphery sealing section for combining the pair of electrode substrates is made of the same material as that of the adhesive spacers.

With this arrangement, since the periphery sealing section can be formed in the same step as in the step of forming the adhesive spacer, it is possible to omit the step of applying the sealant, and the manufacturing steps are simplified.

In the liquid crystal panel in accordance with the present invention, as mentioned above, a high polymer film is suitably adopted as the coating layer.

Further, the liquid crystal panel in accordance with the present invention also has an arrangement, in addition to the described arrangements, the coating layer has optical isotropy.

This is because when the coating layer is optically anisotropic, the displaying light transmitted through the liquid crystal layer is modulated by the coating layer. Thus, with the above arrangement, it is possible to prevent the displaying light transmitted through the liquid crystal layer from being modulated by the coating layer, thereby obtaining desirable displaying characteristics.

Also, the liquid crystal panel in accordance with the present invention has an arrangement wherein the coating layer is made of thermoplastic resin of olefin having a ring stricture.

The thermoplastic resin of olefin having a ring stricture has optical isotropy and high transmittance for UV light having a wavelength of 300 nm to 400 nm. Thus, by adopting the above arrangement, desirable displaying can be performed without disturbing the displaying characteristics, and as the adhesive, it is possible to use a UV light curable adhesive having high curing rate, which is easy to handle, thus improving the operability.

In a manufacturing method of a liquid crystal panel in accordance with the present invention for manufacturing a liquid crystal panel having a structure wherein at least one of the pair of electrode substrates is composed of a plurality of small substrates connected to one another on the sides, after attaching the plurality of small substrates to the single unit electrode substrate via a sealant, the adhesive is applied on the connected portion and the entire surface of the small substrates, and a coating layer having flexibility is attached levely so as to cover the small substrates, and thereafter the adhesive is cured.

With this method, since the plurality of small substrates are first attached to the single unit electrode substrate via a sealant, even when the thicknesses of the small substrates vary, the cell gap does not become nonuniform.

Also, even when a step-difference is generated on the surface to be attached to the coating layer due to the difference in thickness of the small substrates, since the coating layer is attached levely by adjusting the thickness of the adhesive layer, an air bubble is not trapped at the step-difference portion, and by the coating layer, the adhesive protruded from the connected portion is prevented from being exposed, thereby eliminating the problem that the connected portion becomes noticeable by the protrusion of the adhesive.

Therefore, by adopting the described manufacturing method, it is possible to obtain a large screen liquid crystal panel in which the connected portion is not noticeable, thus manufacturing a liquid crystal display device capable of high quality image displaying.

In another manufacturing method of a liquid crystal panel in accordance with the present invention for manufacturing a liquid crystal panel having a structure wherein a plurality of divided liquid crystal panels, which are the pair of electrode substrates sandwitching the liquid crystal layer, are connected to one another on the sides so as to constitute a single multi-panel, after placing the plurality of divided liquid crystal panels on a supporting substrate applied with the adhesive, the adhesive is applied on the connected portion and the entire surface of the divided liquid crystal panels, and a coating layer having flexibility is attached levely so as to cover the divided liquid crystal panels, and thereafter the adhesive is cured.

With this method, even when a step-difference is generated on the surface to be attached to the coating layer due to the difference in thickness of the small substrates, since the coating layer is attached levely by adjusting the thickness of the adhesive layer, an air bubble is not trapped at the step-difference portion, and by the coating layer, the adhesive protruded from the connected portion is prevented from being exposed, thereby eliminating the problem that the connected portion becomes noticeable by the protrusion of the adhesive.

Therefore, by adopting the described manufacturing method, it is possible to obtain a large screen liquid crystal panel in which the connected portion is not noticeable, thus manufacturing a liquid crystal display device capable of high quality image displaying.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal panel comprising:
   a pair of electrode substrates and a liquid crystal layer sandwiched between said pair of electrode substrates,
   one of said pair of electrode substrates being a substrate of a single unit and an other of said pair of electrode substrates being composed of a plurality of small substrates connected to one another on sides, the plurality of small substrates combined with the substrate of a single unit, wherein an adhesive layer is formed on a connected portion and an entire surface of the plurality of small substrates, and a coating layer having flexibility is attached via the adhesive layer so as to cover the plurality of small substrates, and a thickness of the adhesive layer is adjusted so as to eliminate a step-difference due to thickness non-uniformity of the plurality of small substrates, and a surface of said pair of electrode substrates is leveled by the adhesive layer and the coating layer.

2. The liquid crystal panel as set forth in claim 1, wherein an adhesive spacer is provided between said pair of electrode substrates, the adhesive spacer connecting to each other said pair of electrode substrates and maintaining a predetermined dimension of a thickness of said liquid crystal layer.

3. The liquid crystal panel as set forth in claim 2, wherein a periphery sealing section for combining with each other said pair of electrode substrates is made of a material same as a material of the adhesive spacer.

4. The liquid crystal panel as set forth in claim 2, wherein the adhesive spacer is provided on a non-transmissive region between display pixel units, each of the display pixel units constituting one display unit.

5. The liquid crystal panel as set forth in claim 1, wherein the coating layer is made from a high polymer film.

6. The liquid crystal panel as set forth in claim 5, wherein the high polymer film is made of thermoplastic resin of olefin having a ring structure.

7. The liquid crystal panel as set forth in claim 1, wherein the coating layer has optical isotropy.

8. The liquid crystal panel as set forth in claim 1, wherein the coating layer has high transmittance for ultra violet light.

9. The liquid crystal panel as set forth in claim 1, wherein an adhesive used for the adhesive layer is a transparent UV curable adhesive.

10. The liquid crystal panel as set forth in claim 1, wherein a refractive index of an adhesive used for the adhesive layer is substantially same as a refractive index of a substrate part of said pair of electrode substrates.

11. The liquid crystal panel as set forth in claim 1, wherein an adhesive used for the adhesive layer has a viscosity in a range of 300 cP to 2000 cP.

12. A liquid crystal panel comprising:

a single multi-panel composed of a plurality of divided liquid crystal panels connected to one another on sides, said plurality of divided liquid crystal panels being a pair of electrode substrates sandwiching a liquid crystal layer; and a supporting substrate combined with said single multi-panel, the plurality of divided liquid crystal panels being combined with said supporting substrate via an adhesive layer, the adhesive layer being formed on a connected portion and an entire surface of the plurality of divided liquid crystal panels, the plurality of divided liquid crystal panels being covered with a coating layer having flexibility via the adhesive layer, the adhesive layer and the coating layer leveling a surface of said single multi-panel, a thickness of the adhesive layer being adjusted so as to eliminate a step-difference due to thickness non-uniformity of substrates constituting the plurality of divided liquid crystal panels, and a surface of the single multi-panel being leveled by the adhesive layer and the coating layer.

13. The liquid crystal panel as set forth in claim 12, wherein an adhesive spacer is provided between said pair of electrode substrates, the adhesive spacer connecting to each other said pair of electrode substrates and maintaining a predetermined dimension of a thickness of said liquid crystal layer.

14. The liquid crystal panel as set forth in claim 13, wherein a periphery sealing section for combining with each other said pair of electrode substrates is made of a material same as a material of the adhesive spacer.

15. The liquid crystal panel as set forth in claim 12, wherein the coating layer is made from a high polymer film.

16. The liquid crystal panel as set forth in claim 15, wherein the high polymer film is made of thermoplastic resin of olefin having a ring structure.

17. The liquid crystal panel as set forth in claim 12, wherein the coating layer has optical isotropy.

18. A method for manufacturing a liquid crystal panel, comprising the steps of:

forming a pair of electrode substrates facing each other by combining with each other via a sealant (A) an electrode substrate composed of a plurality of small substrates connected to one another on sides and (B) a single unit electrode substrate;

enclosing a liquid crystal layer in a spacing between the pair of electrode substrates; and applying an adhesive on a connected portion and an entire surface of the plurality of small substrates, and attaching a coating layer having flexibility levelly so as to cover the plurality of small substrates by adjusting a thickness of the adhesive on the surface of the plurality of small substrates so that a step-difference due to thickness non-uniformity of the plurality of small substrates is eliminated, and thereafter curing the adhesive.

19. The method as set forth in claim 18, wherein the coating layer is attached by adjusting the thickness of the adhesive while pushing out air bubbles by applying a uniform pressure on the coating layer.

20. The method as set forth in claim 19, wherein a roller or squeegee is used to attach the coating layer.

21. A method for manufacturing a liquid crystal panel, comprising the steps of:

placing a plurality of divided liquid crystal panels on a supporting substrate applied with an adhesive so as to connect the plurality of divided liquid crystal panels to one another on sides, the plurality of divided liquid crystal panels being a pair of electrode substrates sandwiching a liquid crystal layer; and applying an adhesive on a connected portion and an entire surface of the plurality of divided liquid crystal panels, and attaching a coating layer having flexibility levelly so as to cover the plurality of divided liquid crystal panels by adjusting a thickness of the adhesive on the surface of the plurality of divided liquid crystal panels so that a step-difference due to thickness non-uniformity of substrates constituting the plurality of divided liquid crystal panels is eliminated, and thereafter curing the adhesive.

22. The method as set forth in claim 21, wherein the coating layer is attached by adjusting the thickness of the adhesive while pushing out air bubbles by applying a uniform pressure on the coating layer.

23. The method as set forth in claim 22, wherein a roller or squeegee is used to attach the coating layer.

* * * * *